US011392125B2

(12) United States Patent
Fujiyama et al.

(10) Patent No.: US 11,392,125 B2
(45) Date of Patent: Jul. 19, 2022

(54) DOCKING SUPPORT DEVICE OF MARINE VESSEL

(71) Applicant: Mitsubishi Electric Corporation, Tokyo (JP)

(72) Inventors: Naoyuki Fujiyama, Tokyo (JP); Ryo Sakaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 189 days.

(21) Appl. No.: 16/353,393

(22) Filed: Mar. 14, 2019

(65) Prior Publication Data

US 2020/0042004 A1    Feb. 6, 2020

(30) Foreign Application Priority Data

Aug. 1, 2018   (JP) .............................. JP2018-144674

(51) Int. Cl.
*G05D 1/02*      (2020.01)
*G01S 17/08*     (2006.01)
*G01S 17/93*     (2020.01)

(52) U.S. Cl.
CPC ............ *G05D 1/0206* (2013.01); *G01S 17/08* (2013.01); *G01S 17/93* (2013.01)

(58) Field of Classification Search
CPC ....... G05D 1/0206; G01S 17/08; G01S 17/93; G01S 13/917; G01S 2205/00; B60G 2400/823
See application file for complete search history.

(56) References Cited

U.S. PATENT DOCUMENTS

| 3,690,767 A | 9/1972 | Missio et al. |
| 2004/0222902 A1 | 11/2004 | Wortsmith |
| 2012/0072059 A1 | 3/2012 | Glaeser |

(Continued)

FOREIGN PATENT DOCUMENTS

| EP | 3214521 | * 6/2017 | ............. G05D 1/021 |
| JP | 2003-276677 A | 10/2003 | |

(Continued)

OTHER PUBLICATIONS

Communication dated Jul. 9, 2019 from the Japanese Patent Office in application No. 2018-144674.

*Primary Examiner* — Russell Frejd
*Assistant Examiner* — Anthony M Gartrelle
(74) *Attorney, Agent, or Firm* — Sughrue Mion, PLLC; Richard C. Turner

(57) ABSTRACT

To provide a docking support device of a marine vessel, which is capable of improving the accuracy in the distance measurement of a docking object, and can determine whether docking at the docking object is achievable or not, by detecting an obstacle which lies in the surrounding area of an own marine vessel. A docking support device of a marine vessel includes a LiDAR with the use of a laser, a short range body detection sensor, a docking object detector detecting a docking object based on an output signal of the LiDAR, an obstacle detector detecting an obstacle based on an output signal of the short range body detection sensor, and a docking determination calculator determining whether docking at the docking object is achievable or not, based on a determination result of the docking object and a detection result of the obstacle, and outputs a determination result.

5 Claims, 6 Drawing Sheets

(56) References Cited

U.S. PATENT DOCUMENTS

2013/0297104 A1* 11/2013 Tyers .................... B63H 21/21
2015/0256970 A1*  9/2015 Arteaga ................. H04W 4/02
2019/0361446 A1* 11/2019 Ward ....................... G05D 1/02

FOREIGN PATENT DOCUMENTS

| JP | 2005028891 A | 2/2005 | | |
| JP | 2012528417 A | 11/2012 | | |
| WO | WO 2018/232377 A1 | * | 12/2018 | |
| WO | WO 2019/231464 | * | 12/2019 | ............... G05D 1/02 |

* cited by examiner

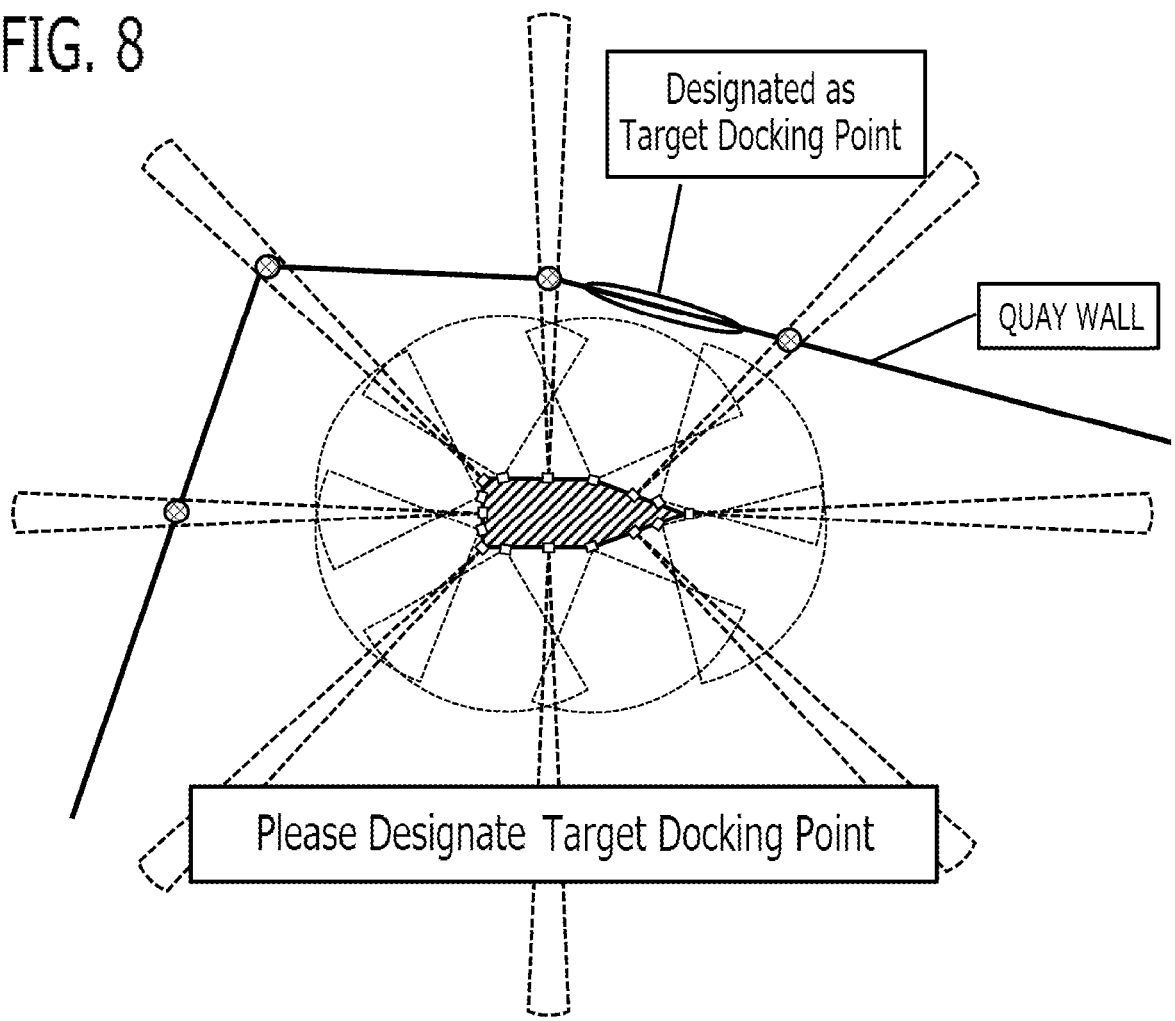

DOCKING SUPPORT DEVICE OF MARINE VESSEL

INCORPORATION BY REFERENCE

The disclosure of Japanese Patent Application No. 2018-144674 filed on Aug. 1, 2018 including its specification, claims and drawings, is incorporated herein by reference in its entirety.

BACKGROUND

The present disclosure relates to a docking support device of a marine vessel.

For example, the technology described in JP-A-2003-276677 has been already known. In the technology of JP-A-2003-276677, a millimeter wave radar was attached to a marine vessel, and the distance from the marine vessel to a docking object, like a landing pier, was measured, and the marine vessel was auto-docked at a landing pier, based on the measured distance.

SUMMARY

Even so, in the situation where auto docking is employed to dock a marine vessel at a landing pier, millimeter wave radars have several issues in accurately measuring a relative distance and a relative angle between the marine vessel and the landing pier, such as, (1) an issue that there is variation in the measured distance, because the intensity of the reflection varies depending on the shape of an object, (2) an issue that the measurement of distances cannot be performed beyond the resolution limit of a millimeter wave radar device, (3) an issue that it is probable that the measurement of distances cannot be achieved due to the specular reflection, and (4) an issue that the accuracy in the measurement of distances is decreased by the mixing of reflections from a non-object body in the surrounding area.

Meanwhile, reflections from a buoy floating between a marine vessel and a landing pier, a stake or a pole protruding from the water surface, a person floating on the water surface, and the like are low in intensity, even if the relative distance between a marine vessel and a landing pier can be measured accurately with the use of a millimeter wave radar. The measurement of distances may fail with high probability, and thus, it is likely that those bodies cannot be detected as an obstacle.

Hence, desired is a docking support device of a marine vessel which is capable of enhancing the accuracy in the distance measurement of a docking object, and can determine whether docking at the docking object is achievable or not, by detecting an obstacle which lies in the surroundings of an own marine vessel.

A docking support device of a marine vessel according to the present disclosure includes a LiDAR which detects a distance of a body lying in the surroundings of an own marine vessel, with the use of a laser; a short range body detection sensor which has a detectable distance of the body shorter than that of the LiDAR; a docking object detection unit which detects a docking object, which is an object at which the own marine vessel is to dock, based on an output signal of the LiDAR; an obstacle detection unit which detects an obstacle in the surroundings of the own marine vessel, based on an output signal of the short range body detection sensor; and a docking determination unit which determines whether docking at the docking object is achievable or not, based on a detection result of the docking object and a detection result of the obstacle, and outputs a determination result.

The LiDAR, which is a sensor using a laser, can improve the resolution and the accuracy in the detection of distance. Because docking objects are detected based on the detection result of the LiDAR, the accuracy in the distance measurement of a docking object can be increased. Furthermore, the LiDAR detects a body which lies on a laser irradiated straight line, and measures the distance to the body. Accordingly, illumination with the laser is easy to irradiate relatively large docking objects, such as a quay wall and a landing pier, and the detection of those docking objects is easy to achieve. However, illumination with the laser is hard to irradiate relatively small obstacles, such as a buoy and a stake, and the detection of those obstacles is hard to achieve. Even if the radiation direction of the laser is scanned, it is likely that some obstacles may fail to be detected, when scanning with high angular resolution is not employed. Furthermore, even if scanning with high angular resolution is employed, rolling of an own marine vessel during the scanning operation produces an area which becomes out of the scanning range, and it is likely that some obstacles may fail to be detected. Then, in addition to the LiDAR, a short range body detection sensor which is designed for short range use only is provided, and the certainty in the detection of an obstacle can be improved. Moreover, it can be determined with a sufficient degree of accuracy whether docking at the docking object is achievable or not, based on the detection result of a docking object by the LiDAR and the detection result of an obstacle by the short range body detection sensor. Then, according to the docking support device of a marine vessel pertinent to the present disclosure, the accuracy in the distance measurement of a docking object can be enhanced. In addition, the docking support device detects obstacles which lie in the surrounding area of the own marine vessel and can determine whether docking at the docking object is achievable or not.

BRIEF DESCRIPTION OF THE DRAWINGS

FIG. 8 is a drawing for explaining the designation of a target docking point in accordance with Embodiment 1.

DETAILED DESCRIPTION OF THE EMBODIMENTS

Embodiment 1

Figure 1:
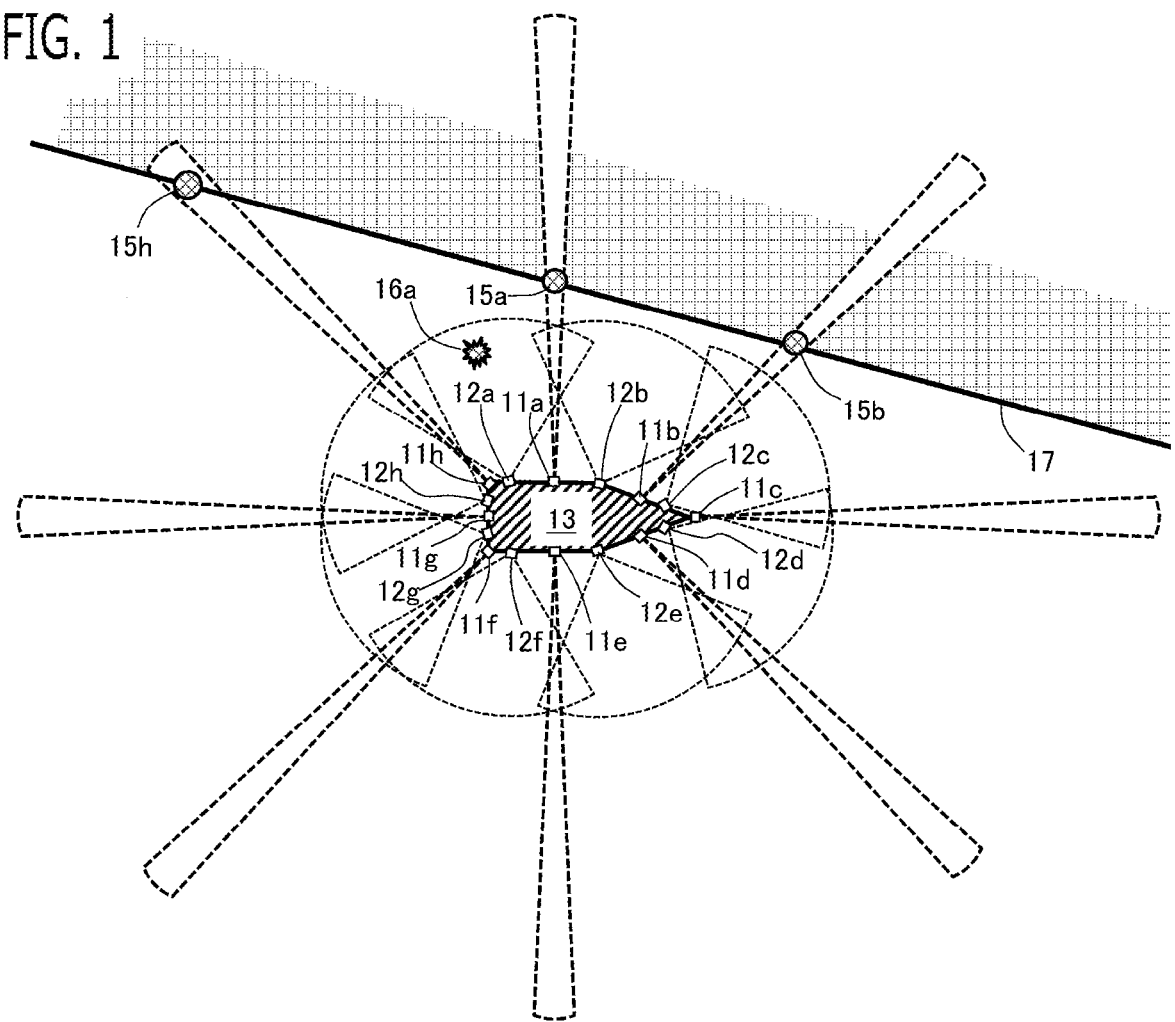
FIG. 1 is a schematic diagram for explaining the body detection in the surroundings of an own marine vessel, in accordance with Embodiment 1.
Figure 2:
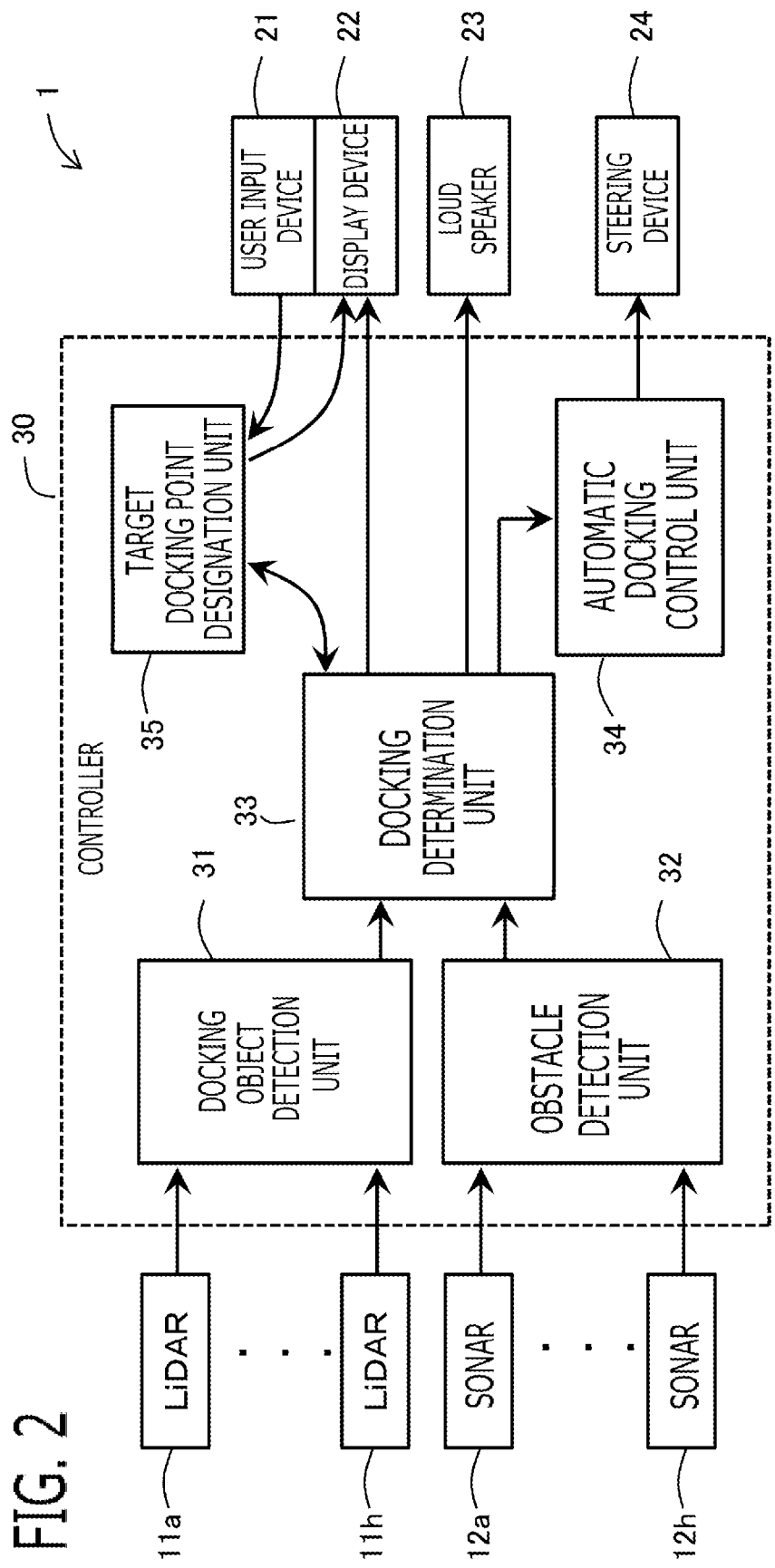
FIG. 2 is a block diagram of a docking support device of a marine vessel in accordance with Embodiment 1.
Figure 3:
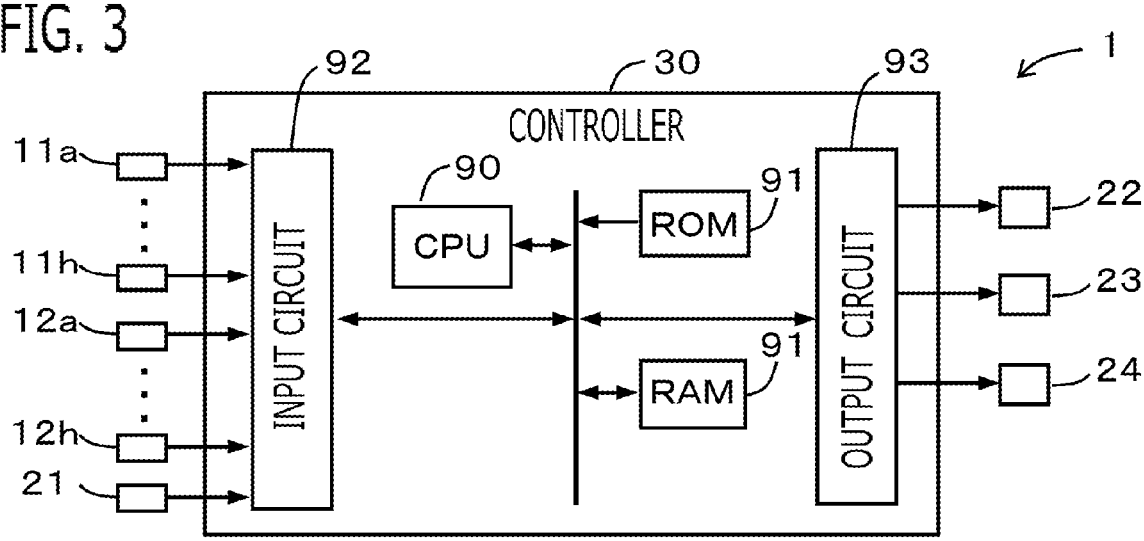
FIG. 3 is a hardware configuration diagram of the docking support device of the marine vessel in accordance with Embodiment 1.

With reference to drawings, explanation will be made about a docking support device of a marine vessel 1 (hereinafter, referred to simply as a docking support device 1), in accordance with Embodiment 1. The docking support device 1 is provided with LiDARs 11 (Light Detection and Ranging) and short range body detection sensors 12. In a top down view of the marine vessel, FIG. 1 is a schematic diagram for explaining the body detection in the surroundings of the own marine vessel 13 by the LiDARs 11 and the short range body detection sensors 12. In FIG. 1, body detection ranges of the respective sensors are shown with broken lines. FIG. 2 is a schematic block diagram of the docking support device 1, and FIG. 3 is a hardware configuration diagram of the docking support device 1.

1-1. LiDAR 11

The LiDAR 11 irradiates with a laser to measure the scattered light of the laser beam which illuminated a body, and detects a distance to the body. The LiDAR 11 outputs, toward the outside, information on the relative distance of a detected body from the LiDAR 11, information on the relative angle of the detected body with regard to the LiDAR 11, information on the detected intensity of the body, and others. The output signals of the LiDAR 11 are entered into the controller 30.

In the present embodiment, a plurality of LiDARs 11 (eight sets in the present case, 11a to 11h) are provided. Each of the LiDARs 11 has a laser irradiation angular range of the horizontal direction (a detection angular range), which is a predetermined angular range. The LiDAR 11 is configured not to swing a laser in the horizontal direction. In the present embodiment, the LiDAR 11 is configured to swing a laser in the up and down direction just within a predetermined angular range (for example, 45 degrees), in order to improve the accuracy in the detection of a body against the rolling of the vessel and the locational shift of the body in the up and down direction. It is to be noted that the LiDAR 11 may be configured to swing reflected laser beams in the up and down direction, by rotating a mirror which reflects laser beams, or may be configured to swing laser beams in the up and down direction, by rotating a light emitter of the laser.

The LiDARs 11 are arranged so that each of them detects a body which exists in an angular range of the horizontal direction which is different from others in the surrounding area of the own marine vessel 13. In the present embodiment, a plurality of LiDARs 11 are arranged around the own marine vessel 13 to provide a 360 degree field of view, keeping in-between an angle interval (an angle interval of about 45 degrees) in the horizontal direction, in order that the own marine vessel 13 can be covered with a 360 degree field of all around view. Because the LiDAR 11 provides a several degree of irradiation angular range (detection angular range) in the horizontal direction, a body which falls into the angular range between two adjoining LiDARs 11 cannot be detected. Accordingly, the detection angular ranges of a plurality of LiDARs 11 become discrete angles, which are arranged in the surrounding area of the own marine vessel 13.

1-2. Short Range Body Detection Sensor 12

The short range body detection sensor 12 is a sensor which has a detectable distance of the body shorter than that of the LiDAR 11, and detects the distance to a body lying in the surroundings of the own marine vessel 13. In the present embodiment, the short range body detection sensor 12 employs a sonar sensor, which detects the distance of a body using ultrasonic waves. The short range body detection sensor 12 outputs, toward the outside, information on the relative distance of a detected body from the short range body detection sensor 12, information on the relative angle of the detected body with regard to the short range body detection sensor 12, information on the detected intensity of the body, and others. The output signals of the short range body detection sensor 12 are entered into the controller 30.

In the present embodiment, a plurality of short range body detection sensors 12 (eight sets in the present case, 12a to 12h) are provided. Each of the short range body detection sensors 12 has a detection angular range of the horizontal direction, which is a predetermined angular range. The short range body detection sensor 12 (sonar sensor) is capable of detecting a body which exists within a range of conical shape, where ultrasonic waves are irradiated. The short range body detection sensor 12 (sonar sensor) has a detection angular range of the horizontal direction which is broader than that of the LiDAR 11.

The short range body detection sensors 12 are arranged so that each of them detects a body which exists in an angular range of the horizontal direction which is different from others in the surrounding area of the own marine vessel 13. In the present embodiment, a plurality of short range body detection sensors 12 are arranged around the own marine vessel 13 to provide a 360 degree field of view, keeping in-between an angle interval (an angle interval of about 45 degrees) in the horizontal direction, in order that the own marine vessel 13 can be covered with a 360 degree field of all around view. The short range body detection sensors 12 are arranged so that the detection angular ranges of two adjoining sensors overlap each other, and the detection angular ranges of a plurality of short range body detection sensors 12 build up a 360 degree field of view around the own marine vessel 13.

1-3. Controller 30

The docking support device 1 is provided with a controller 30. As shown in FIG. 2, the controller 30 is provided with control units, which include a docking object detection unit 31, an obstacle detection unit 32, a docking determination unit 33, an automatic docking control unit 34, a target docking point designation unit 35 and the like. Each function in the controller 30 is achieved by processing circuits which are provided in the controller 30. To be more precise, as shown in FIG. 3, the controller 30 includes, as the processing circuits, an arithmetic processing unit 90 (computer) like a CPU (Central Processing Unit), storage devices 91 which exchange data with the arithmetic processing unit 90, an input circuit 92 which inputs external signals to the arithmetic processing unit 90, an output circuit 93 which outputs signals from the arithmetic processing unit 90 to the outside, and the like.

As the storage devices 91, there are provided with a RAM (Random Access Memory) which is configured to be capable of reading out data from and writing them in the arithmetic processing unit 90, a ROM (Read Only Memory) which is configured to be capable of reading out data from the arithmetic processing unit 90, and the like. The input circuit 92 is connected to the LiDARs 11, the short range body detection sensors 12, a user input device 21, etc., and is equipped with input ports which input these output signals into the arithmetic processing unit 90, and the like. The output circuit 93 is connected to a display device 22, a loudspeaker 23, a steering device 24, etc., and is equipped with output ports which output control signals from the arithmetic processing unit 90 to those devices, and others.

In addition, each function in each of the control units 31 to 35 and others, which are provided in the controller 30, is achieved by the arithmetic processing unit 90, which executes instructions from software (programs) stored in the storage devices 91, like a ROM and others, and collaborates with other hardware devices of the controller 30, such as the storage devices 91, the input circuit 92, the output circuit 93, and the like. It is to be noted that setting data, including parameters of the coordinate conversion, which are used in each of the control units 31 to 35 and others, are stored, as a part of software (programs), in the storage devices 91, like a ROM and others. Hereafter, each function in the controller 30 will be explained in detail.

The docking object detection unit 31 detects a docking object 15, which is an object at which the own marine vessel 13 is to dock, based on the output signals of the LiDAR 11. The obstacle detection unit 32 detects an obstacle 16 in the surroundings of the own marine vessel 13, based on output signals of the short range body detection sensor 12. Then, the docking determination unit 33 determines whether docking at the docking object 15 is achievable or not, based on the detection result of the docking object 15 and the detection result of the obstacle 16, and outputs a determination result.

When an obstacle 16, such as a buoy floating on the water surface, a stake or a pole protruding from the ocean surface, a person floating on the water surface, etc., lies between a docking object 15 and the own marine vessel 13, docking at the docking object 15 cannot be achieved. The LiDAR 11 detects a body which lies on a laser irradiated straight line, and measures the distance to the body. For this reason, illumination with the laser is easy to irradiate relatively large docking objects 15, such as a quay wall and a landing pier, and the detection of those docking objects 15 is easy to achieve. However, illumination with the laser is hard to irradiate relatively small obstacles 16, such as a buoy and a stake, and the detection of those obstacles 16 is hard to achieve. Even if two dimensional or three dimensional scanning, in which radiation directions of the laser are scanned, is used, it is likely that failures may occur in the detection of obstacles 16, when scanning with high angular resolution is not employed. Moreover, even if scanning with high angular resolution is employed, rolling of the own marine vessel during the scanning operation produces an area which is out of the scanning range, and it is likely that failures may occur in the detection of obstacles 16. Then, in addition to the LiDAR 11, the short range body detection sensor 12 which is designed for short range use only, is provided, and the certainty in the detection of an obstacle 16 can be enhanced. So, it becomes possible to determine with a sufficient degree of accuracy whether docking at the docking object 15 is achievable or not, based on the detection result of the docking object 15 by the LiDAR 11 and the detection result of the obstacle 16 by the short range body detection sensor 12.

In the present embodiment, a sonar sensor is used as the short range body detection sensor 12, and the sonar sensor detects a body which lies in the range of conical shape, where ultrasonic waves are irradiated, and measures the distance to the body. Accordingly, even if the own marine vessel 13 rolls, ultrasonic waves can be applied to relatively small obstacles 16, such as a buoy and a stake, and thus, occurrence of failures in the detection of obstacles 16 can be reduced.

Figure 7:
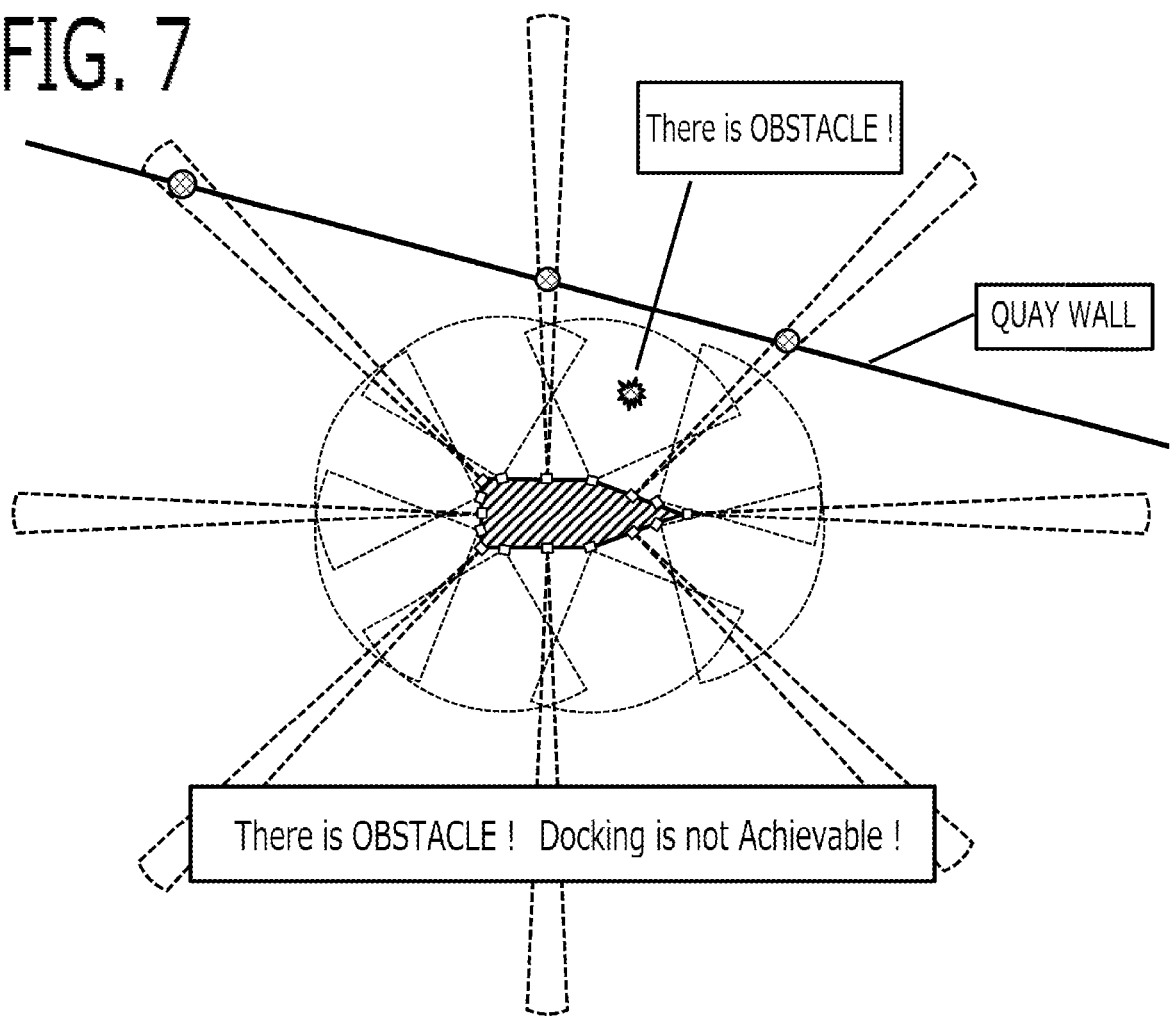
FIG. 7 is a drawing for explaining the informing of a determination result on the achievability of docking in accordance with Embodiment 1.

The docking object detection unit 31 informs a user of a determination result on the achievability of the docking, by way of an informing device, such as the display device 22, the loudspeaker 23 and the like, and what is more, outputs the determination result to the automatic docking control unit 34, which will be described below. For example, as shown in FIG. 7, in a top down view of the marine vessel, the docking object detection unit 31 displays on the display device 22 the own marine vessel 13, detection ranges of the respective LiDARs 11 and the respective short range body detection sensors 12, detected docking objects 15 and an obstacle 16, and also displays a determination result on the achievability of the docking. When it is determined that docking is not achievable, the docking object detection unit 31 displays the obstacle 16, which is recognized as the contributing factor, on the display device 22 in a highlighted manner.

The docking object detection unit 31 determines, from among the bodies which are detected by the LiDARs 11, a body other than docking objects 15 (water surface, a structural object in the background of the docking object 15, and the like), based on information including the relative distance and the relative angle of the body, the reflection intensity of the laser beam, and the like, and extracts a docking object 15, and outputs information on the relative distance of the docking object 15 and the like. For example, the docking object detection unit 31 calculates, from among the bodies which are detected by the LiDARs 11, a gravity center value or an average value of the relative distances of bodies, from which bodies other than the docking object 15 are excluded, as a relative distance of the docking object 15. Or, the docking object detection unit 31 selects (implements filtering) a body with high reflection intensity from among the bodies, from which bodies other than the docking object 15 are excluded, and calculates as a relative distance of the docking object 15.

The obstacle detection unit 32 determines, from among the bodies which are detected by the short range body detection sensor 12, a body other than obstacles 16 (water surface and the like), based on information including the relative distance and the relative angle of the body, the reflection intensity of ultrasonic waves, and others, and extracts an obstacle 16, and then, outputs information on the relative distance of the obstacle 16 and the like.

It is to be noted that docking objects 15, which are detected by the LiDAR 11 and the docking object detection unit 31, also contain an obstacle 16, such as a buoy and a stake, and obstacles 16, which are detected by the short range body detection sensor 12 and the obstacle detection unit 32, also contain a docking object 15. By the enhanced performance of a sensor or detection processing, the docking object detection unit 31 may exclude also an obstacle 16 from among the detected bodies to extract a docking object 15, and the obstacle detection unit 32 may exclude also a docking object 15 from among the detected bodies to extract an obstacle 16.

1-3-1. First Determination Method Based on Relative Distance

Next, explanation will be made about a first determination method for determining based on the relative distance between a docking object 15 and an obstacle 16. The docking object detection unit 31 detects the relative distance of the docking object 15 to the own marine vessel 13, based on the output signals of the LiDAR 11. The obstacle detection unit 32 detects the relative distance of the obstacle 16 to the own marine vessel 13, based on the output signals of the short range body detection sensor 12. The docking determination unit 33 determines whether the obstacle 16 is present or not between the own marine vessel 13 and the docking object 15, based on the relative distance of the docking object 15 and the relative distance of the obstacle 16; and determines that docking is not achievable, when the obstacle 16 is determined to be present there; and determines that docking is achievable, when the obstacle 16 is determined not to be present there.

According to the present configurations, it is possible to determine the difference between the docking object 15 and the obstacle 16 with a sufficient degree of accuracy based on information of the relative distance, and to determine whether docking at the docking object 15 is achievable or not with a sufficient degree of accuracy. For example, when the relative distance of an obstacle 16 by the short range body detection sensor 12 is shorter than the relative distance of a docking object 15 by the LiDAR 11, the docking determination unit 33 determines that the obstacle 16 is present between the own marine vessel 13 and the docking object 15, and further determines that docking is not achievable. In contrast, when the difference between the relative distance of an obstacle 16 by the short range body detection sensor 12 and the relative distance of a docking object 15 by the LiDAR 11 is within the range of a predetermined judgment distance, the docking determination unit 33 determines that the obstacle 16 which is detected by the short range body detection sensor 12 is a body identical with the docking object 15, and further determines that docking is achievable.

In the case where a plurality of LiDARs 11 and a plurality of short range body detection sensors 12 are provided, like in the present embodiment, the docking determination unit 33 determines whether the obstacle 16 is present or not between the own marine vessel 13 and the docking object 15, based on the relative distance of the docking object 15 and the relative distance of the obstacle 16, by the LiDAR 11 and the short range body detection sensor 12, whose detection angular ranges in the surrounding area of the own marine vessel 13 are associated with each other. For example, as shown in FIG. 1, because a first LiDAR 11a is associated with (is close to each other) the angular detection ranges of a first short range body detection sensor 12a and a second short range body detection sensor 12b, the docking determination unit 33 determines whether the obstacle 16 is present or not between the own marine vessel 13 and the docking object 15, based on the relative distance of the docking object 15 detected by the first LiDAR 11a and the relative distance of the obstacle 16 detected by the first short range body detection sensor 12a or the second short range body detection sensor 12b. In the case where the obstacle 16 is determined to be present in any of associated relations, the docking determination unit 33 determines that docking is not achievable.

It is to be noted that the second LiDAR 11b is associated with the second short range body detection sensor 12b and the third short range body detection sensor 12c, in the angular detection range. The eighth LiDAR 11h is associated with the eighth short range body detection sensor 12h and the first short range body detection sensor 12a, in the angular detection range. With regard to other sensors, a LiDAR 11 and short range body detection sensors 12, which have close angular detection ranges with each other, are in the associated relation.

1-3-2. Second Determination Method Based on Relative Distance and Relative Angle Next, explanation will be made about a second determination method for determining based on the relative distances and the relative angles of a docking object 15 and an obstacle 16. The docking object detection unit 31 calculates the relative distance and the relative angle of a docking object 15 to the own marine vessel 13, based on the output signals of the LiDAR 11 and information on the body detection range of the LiDAR 11 to the own marine vessel 13. The obstacle detection unit 32 calculates the relative distance and the relative angle of an obstacle 16 to the own marine vessel 13, based on the output signals of the short range body detection sensor 12 and information on the body detection range of the short range body detection sensor 12 to the own marine vessel 13. Then, the docking determination unit 33 determines whether the obstacle 16 is present or not between the own marine vessel 13 and the docking object 15, based on the relative distance and the relative angle of the docking object 15 and the relative distance and the relative angle of the obstacle 16. When the obstacle 16 is determined to be present there, the docking determination unit 33 determines that docking is not achievable, and when the obstacle 16 is determined not to be present there, the docking determination unit 33 determines that docking is achievable.

According to the present configurations, it is possible to determine relative positional relationships to the own marine vessel 13, regarding the docking object 15 and the obstacle 16, with a more sufficient degree of accuracy, and to determine whether docking at the docking object 15 is achievable or not, with a sufficient degree of accuracy.

Figure 4:
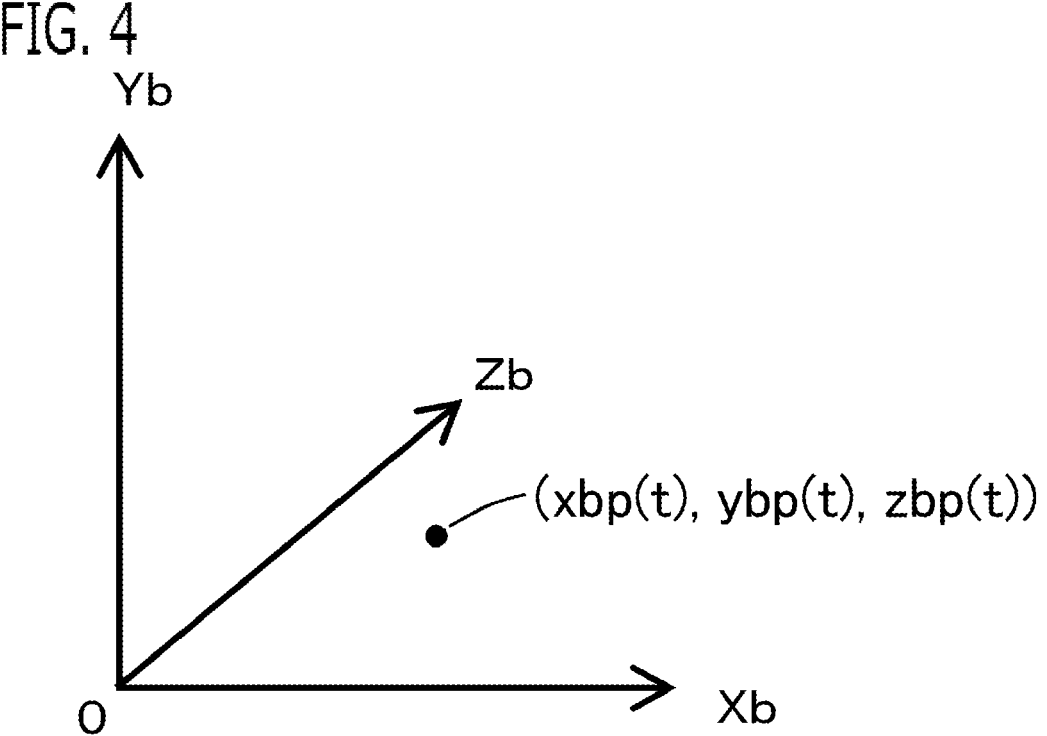
FIG. 4 is a drawing for explaining a marine vessel coordinate system in accordance with Embodiment 1.

Hereinafter, explanation will be made in detail about the relative distance and the relative angle to the own marine vessel 13. FIG. 4 shows a marine vessel coordinate system, which represents a coordinate system to the own marine vessel 13. Assuming that Zb axis is a going straight direction of the own marine vessel 13, Xb axis of a right and left direction and Yb axis of an up and down direction can be defined using the left handed system. A part of the coordinate of a docking object 15 at a certain time T=t in the marine vessel coordinate system can be represented as (xbp (t), ybp (t), zbp (t)).

Figure 5:
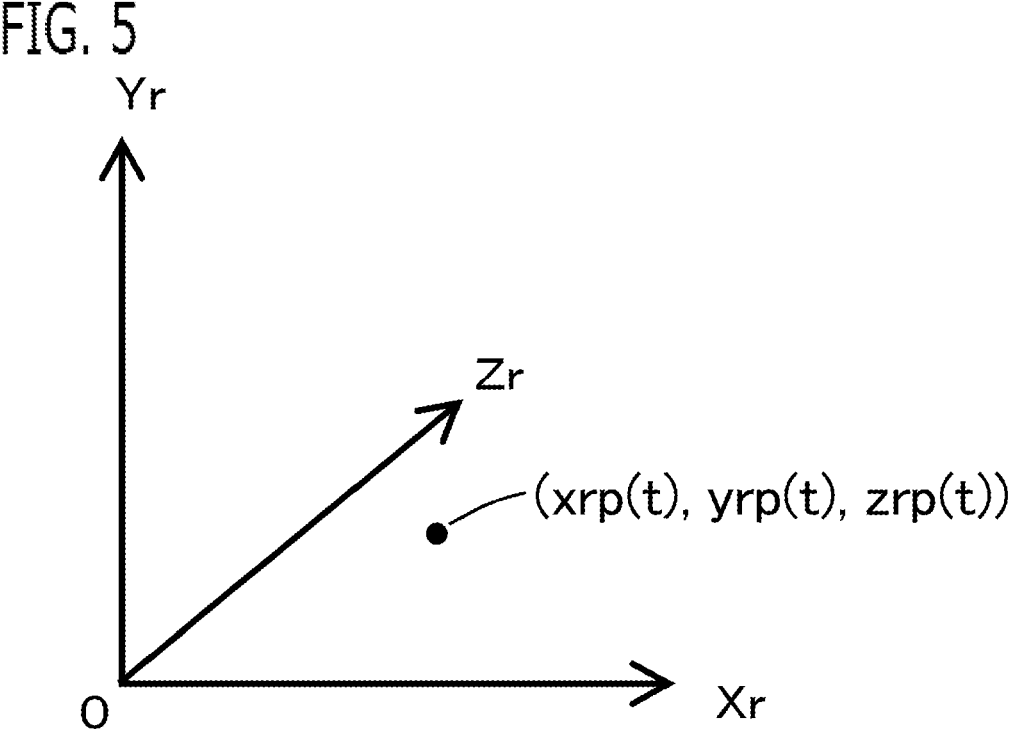
FIG. 5 is a drawing for explaining a LiDAR coordinate system in accordance with Embodiment 1.

A LiDAR coordinate system, which represents a coordinate system to each of the LiDARs 11, is shown in FIG. 5. Assuming that Zr axis is a direction of scanning center angle, Xr axis and Yr axis can be defined using the left handed system. A part of the coordinate of a docking object 15 at a certain time T=t in the LiDAR coordinate system can be represented as (xrp (t), yrp (t), zrp (t)).

Figure 6:
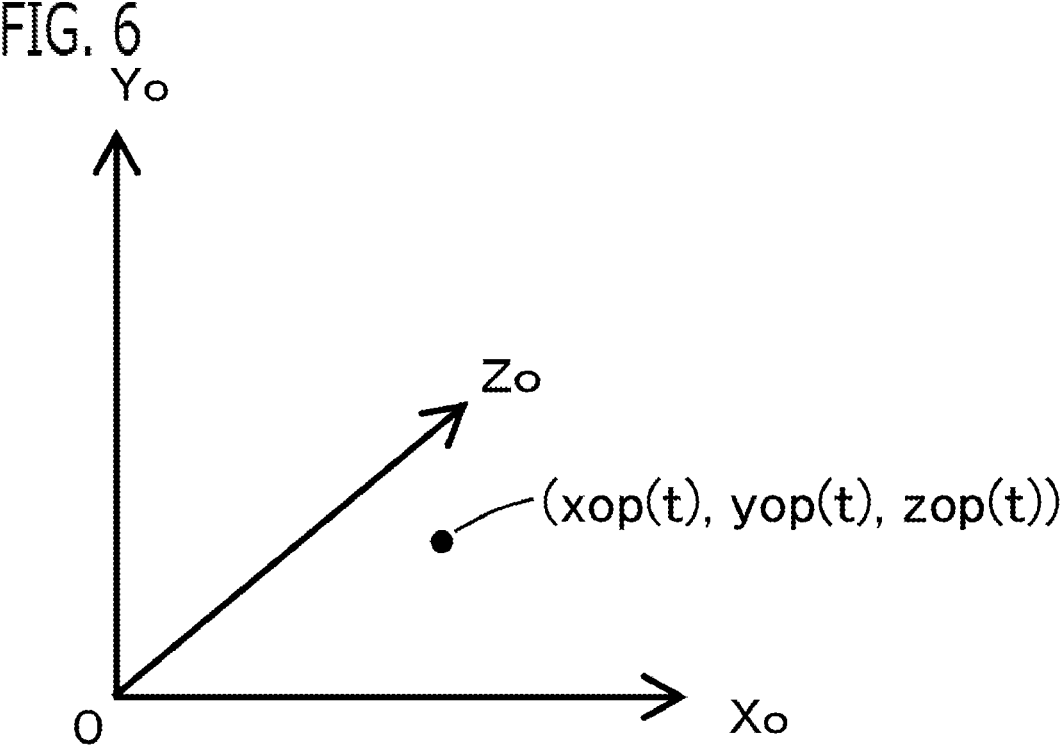
FIG. 6 is a drawing for explaining a short range sensor coordinate system in accordance with Embodiment 1.

A short range sensor coordinate system, which represents a coordinate system to each of the short range body detection sensors 12, is shown in FIG. 6. Assuming that the Zo axis is a direction of the center angle in the detection range, the Xo axis and the Yo axis can be defined using the left handed system. A part of the coordinate of an obstacle 16 at a certain time T=t in the short range sensor coordinate system can be represented as (xop (t), yop (t), zop (t)).

The docking object detection unit 31 calculates a coordinate (xbp (t), ybp (t), zbp (t)) of the docking object 15 in the LiDAR coordinate system, based on the output signals of the LiDAR 11.

Furthermore, by applying rotation and parallel translation to a coordinate in the LiDAR coordinate system with the use of predetermined parameters (r11r, r12r . . . , t1r, t2r, t3r) of the coordinate conversion, the docking object detection unit 31 converts the coordinate (xrp (t), yrp (t), zrp (t)) of an docking object 15 in the LiDAR coordinate system into the coordinate (xbp (t), ybp (t), zbp (t)) of the docking object 15 in the marine vessel coordinate system, as shown in the next equation. The parameters of the coordinate conversion are each predetermined from the relative relations between the LiDAR coordinate system and the marine vessel coordinate system, based on information including mounting locations and angles of the LiDARs 11 in the own marine vessel 13. It is to be noted that, for the sake of simplicity in the explanation, Equation (1) denotes, as a representative case, the coordinate conversion in which coordinates of one LiDAR 11 and one docking object 15 are dealt with.

However, the coordinates of a plurality of LiDARs 11 and a plurality of docking objects 15 are each subjected to the processing of the coordinate conversion, and the respective parameters of the coordinate conversion are set in each of the plurality of LiDARs 11.

$$\begin{bmatrix} xbp(t) \\ ybp(t) \\ zbp(t) \end{bmatrix} = \begin{bmatrix} r11r & r12r & r13r \\ r21r & r22r & r23r \\ r31r & r32r & r32r \end{bmatrix} \begin{bmatrix} xrp(t) \\ yrp(t) \\ zrp(t) \end{bmatrix} + \begin{bmatrix} t1r \\ t2r \\ t3r \end{bmatrix} \quad (1)$$

The obstacle detection unit 32 calculates a coordinate (xop (t), yop (t), zop (t)) of the obstacle 16 in the short range sensor coordinate system, based on the output signals of the short range body detection sensor 12.

In addition, by applying rotation and parallel translation to a coordinate in the short range sensor coordinate system with the use of predetermined parameters (r11o, r12o . . . , t1o, t2o, t3o) of the coordinate conversion, the obstacle detection unit 32 converts the coordinate (xop (t), yop (t), zop (t)) of an obstacle 16 in the short range sensor coordinate system into the coordinate (xbp (t), ybp (t), zbp (t)) of the obstacle 16 in the marine vessel coordinate system. The parameters of the coordinate conversion are each predetermined from the relative relations between the short range sensor coordinate system and the marine vessel coordinate system, based on information including mounting locations and angles of the short range body detection sensors 12 in the own marine vessel 13. It is to be noted that, for the sake of simplicity in the explanation, Equation (2) denotes, as a representative case, the coordinate conversion in which coordinates of one short range body detection sensor 12 and one obstacle 16 are dealt with. However, the coordinates of a plurality of short range body detection sensors 12 and a plurality of obstacles 16 are each subjected to the processing of the coordinate conversion, and the respective parameters of the coordinate conversion are set in each of the plurality of short range body detection sensors 12.

$$\begin{bmatrix} xbp(t) \\ ybp(t) \\ zbp(t) \end{bmatrix} = \begin{bmatrix} r11o & r12o & r13o \\ r21o & r22o & r23o \\ r31o & r32o & r33o \end{bmatrix} \begin{bmatrix} xop(t) \\ yop(t) \\ zop(t) \end{bmatrix} + \begin{bmatrix} t1o \\ t2o \\ t3o \end{bmatrix} \quad (2)$$

As shown in FIG. 1, FIG. 7, and FIG. 8, the docking determination unit 33 calculates a boundary line 17 of the docking objects 15 in the marine vessel coordinate system, by connecting the coordinates of two docking objects 15 which are closely located each other. In the present embodiment, the docking determination unit 33 calculates a boundary line 17 of the docking objects 15 at the own marine vessel 13 side, by connecting the coordinates, in the marine vessel coordinate system, of two docking objects 15, which are detected by two neighboring LiDARs 11 arranged in the surrounding area of the own marine vessel 13. The docking determination unit 33 may not only create the connection between the two coordinates at the end points of the boundary line 17, but also extend a straight line toward an outer side of the two coordinates. Further, the docking determination unit 33 may calculate a relative angle between the travelling direction (Zb axis) of the own marine vessel 13 and the boundary line 17 connecting the two docking objects 15.

Then, in the marine vessel coordinate system, the docking determination unit 33 determines that docking is not achievable, when the coordinate of the obstacle 16 is present in a region between the boundary line 17 of the docking objects 15 and the own marine vessel 13, and determines that docking is achievable, when the coordinate of the obstacle 16 is not present there.

It is to be noted that the own marine vessel 13 is located near the original point of the marine vessel coordinate system. The docking determination unit 33 may determine whether the coordinate of the obstacle 16 is present or not in a region between the boundary line 17 of the docking objects 15 and the outline of the own marine vessel 13, using predetermined coordinate information on the outline of the own marine vessel 13. For example, the docking determination unit 33 determines whether the coordinate of the obstacle 16 is present or not in a region sandwiched between the boundary line 17 of the docking objects 15 and the outline of the own marine vessel 13, when viewed in the Yb axis direction of the marine vessel coordinate system (the up and down direction of the marine vessel).

1-3-3. Target Docking Point Designation Unit 35

The target docking point designation unit 35 accepts, from a user, the designation to designate a target docking point at which docking is actually to be performed, from among docking objects 15 which are detected by the docking object detection unit 31. The target docking point designation unit 35 displays the detected docking objects 15 on the display device 22, and sets, as a target docking point, a point or an area which is designated by the user via the user input device 21, from among the docking objects 15 which are shown by a point or a line. For example, as shown in FIG. 8, the target docking point designation unit 35 displays, in a top down view of the marine vessel, on the display device 22, the own marine vessel 13, the detected positions of each docking object 15, and the boundary line 17 connecting the two docking objects 15, and accepts the selection from the user.

The docking determination unit 33 determines whether the obstacle 16 is present or not between the own marine vessel 13 and the target docking point, and determines whether docking is achievable or not, depending on the presence or absence of the obstacle 16. According to the present configurations, it becomes possible to determine whether the obstacle 16 is present or not between the target docking point and the own marine vessel 13, even in a case where the surroundings of the own marine vessel 13 is enclosed by quay walls, and obstacles 16 which lie between docking objects 15 other than the target docking point and the own marine vessel 13 can be excluded from the determination in the achievability of docking. Accordingly, determination fitting for the user's purpose can be performed.

1-3-4. Automatic Docking Control Unit 34

In order to achieve the docking at a docking object 15, the automatic docking control unit 34 performs automatic docking control, which drives a marine vessel in an automatic steering mode. By carrying out the control of steering and driving force, the automatic docking control unit 34 drives the marine vessel to dock at a docking object 15, with the designated side face of the marine vessel directing to the docking object (left hand side docking, right hand side docking, rear docking, front docking, and the like). The automatic docking control unit 34 transmits a steering command value and a driving force command value, to the steering device 24, which makes adjustments in the steering and the driving force. The automatic docking control unit 34 receives positional information on the docking object 15 and the obstacle 16 from the docking determination unit 33, and performs automatic steering of the marine vessel, using the positional information on the docking object 15 (relative distance, relative angle, and the like, between the docking object 15 and the own marine vessel 13). In the case where a target docking point is designated by the target docking point designation unit 35, the automatic docking control unit 34 performs, in the automatic docking control, automatic steering of the marine vessel, in order to achieve the docking at the target docking point.

The automatic docking control unit 34 performs the automatic docking control, in the case where it is determined by the docking determination unit 33 that docking is achievable, and ceases the automatic docking control, in the case where it is determined by the docking determination unit 33 that docking is not achievable. Furthermore, the automatic docking control unit 34 may perform automatic steering of the marine vessel, in such a way that the marine vessel keeps away from the detected obstacle 16, with a separation larger than a predetermined distance.

Other Embodiments

Lastly, other embodiments of the present disclosure will be explained. Each of the configurations of embodiments to be explained below is not limited to be separately utilized, but can be utilized in combination with the configurations of other embodiments, as long as no discrepancy occurs.

(1) In the above mentioned Embodiment 1, a case in which the short range body detection sensor 12 employs a sonar sensor has been explained as an example. However, embodiments of the present disclosure are not limited to the foregoing case. That is to say, the short range body detection sensor 12 can employ any other sensor than a sonar sensor, as long as the sensor has a detectable distance of the body which is shorter than that of the LiDAR 11. For example, the short range body detection sensor may be a camera sensor which detects the distance to a body with the use of a picture image which is image pick-upped with a camera.

(2) In the above mentioned Embodiment 1, a case in which the target docking point designation unit 35 and the automatic docking control unit 34 are provided has been explained as an example. However, embodiments of the present disclosure are not limited to the foregoing case. That is to say, the automatic docking control unit 34 is not provided, and the docking determination unit 33 may only inform a user of a determination result on the achievability of docking, via an informing device.

(3) In the above mentioned Embodiment 1, a case in which the LiDAR 11 swings a laser in the up and down direction, and does not swing it in the horizontal direction has been explained as an example. However, embodiments of the present disclosure are not limited to the foregoing case. That is to say, the LiDAR 11 may be configured to swing a laser in the horizontal direction, or may be configured not to swing a laser at all.

(4) In the above mentioned Embodiment 1, a case in which the LiDARs 11 and the short range body detection sensors 12 are arranged around the own marine vessel 13 to provide a 360 degree field of view has been explained as an example. However, embodiments of the present disclosure are not limited to the foregoing case. That is to say, with regard to the arrangement of LiDARs 11 and short range body detection sensors 12, the LiDARs 11 and the short range body detection sensors 12 may be provided only on a lateral side (for example, the port side only) of the own marine vessel which is to perform docking, in the case where the own marine vessel has a limited lateral face of the docking (for example, the port side face only).

(5) In the above mentioned Embodiment 1, a case in which the controller 30 is provided with the control units 31 to 35 and others has been explained, as an example. However, embodiments of the present disclosure are not limited to the foregoing case. That is to say, each of the control units 31 to 35 is distributed among a plurality of controllers, and the plurality of controllers may be configured to make communications with each other. For example, a case is allowed where the control units 31 to 33 and 35 are provided in one controller, and the automatic docking control unit 34 is provided in another controller.

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A docking support device of a marine vessel comprising:
   a LiDAR detecting a distance of a body which lies in the surroundings of an own marine vessel, with use of a laser, and whose detection angular range in a horizontal direction is several degrees,
   a short range body detection sensor whose detectable distance of the body is shorter than a detectable distance of the LiDAR, and whose detection angular range in the horizontal direction is broader than that of the LiDAR,
   a docking object detector detecting a docking object, which is an object at which the own marine vessel is to dock, based on an output signal of the LiDAR,
   an obstacle detector detecting an obstacle in the surroundings of the own marine vessel, based on an output signal of the short range body detection sensor, and
   a docking determination calculator determining whether docking at the docking object is achievable or not, based on a detection result of the docking object and a detection result of the obstacle, and outputs a determination result,
   wherein the docking object detector calculates a coordinate of the docking object in a LiDAR coordinate system, which is a coordinate system to the LiDAR, based on the output signal of the LiDAR; and by applying rotation and parallel translation with use of predetermined parameters of coordinate conversion, converts the coordinate of the docking object in the LiDAR coordinate system into a coordinate of the docking object in a marine vessel coordinate system, which is a coordinate system to the own marine vessel, and
   the obstacle detector calculates a coordinate of the obstacle in a short range sensor coordinate system, which is a coordinate system to the short range body detection sensor, based on the output signal of the short range body detection sensor; and, by applying rotation and parallel translation with the use of predetermined parameters of coordinate conversion, converts the coordinate of the obstacle in the short range sensor coordinate system into a coordinate of the obstacle in the marine vessel coordinate system wherein the docking determination calculator, in the marine vessel coordinate system, connects coordinates of two docking objects, which are closely located each other, to calculate a boundary line of the docking objects; and, in the marine vessel coordinate system, determines that docking is not achievable in a case where the coordinate of the obstacle is present in a region between the boundary line and the own marine vessel, and determines that docking is achievable in a case where the coordinate of the obstacle is not present, wherein the LiDARs, which are provided in plural, are arranged so that each of the LiDARs detects a body which exists in an angular range of the horizontal direction which is different from others in the surrounding area of the own marine vessel, and the short range body detection sensors, which are provided in plural, are arranged so that each of the short range body detection sensors detects a body which exists in an angular range of the horizontal direction which is different from others in the surrounding area of the own marine vessel.

2. The docking support device of the marine vessel according to claim 1, wherein the docking determination calculator informs a user of a determination result on the achievability of docking, via an informing device.

3. The docking support device of the marine vessel according to claim 1, further comprising an automatic docking controller performing automatic docking control which performs automatic steering of a marine vessel, in order to achieve the docking at the docking object, wherein the automatic docking controller performs the automatic docking control, in a case where it is determined by the docking determination calculator that docking is achievable, and ceases the automatic docking control, in a case where it is determined by the docking determination calculator that docking is not achievable.

4. The docking support device of the marine vessel according to claim 3, further comprising a target docking point designation calculator accepting from a user designation to designate a target docking point at which docking is actually to be performed, from among docking objects which are detected by the docking object detector, wherein the docking determination calculator determines whether the obstacle is present or not between the own marine vessel and the target docking point, and determines whether docking is achievable or not, depending on the presence or absence of the obstacle, and the automatic docking controller performs, in the automatic docking control, automatic steering of the marine vessel, in order to achieve the docking at the target docking point.

5. The docking support device of the marine vessel according to claim 1, wherein the short range body detection sensor is a sonar sensor or a camera sensor, having function to detect a distance to a body.

\* \* \* \* \*